United States Patent
Huang

(10) Patent No.: US 11,075,834 B2
(45) Date of Patent: Jul. 27, 2021

(54) NETWORK INTERFACE CARDS, FABRIC CARDS, AND LINE CARDS FOR LOOP AVOIDANCE IN A CHASSIS SWITCH

(71) Applicant: Accton Technology Corporation, Hsinchu (TW)

(72) Inventor: Chin-Chieh Huang, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 24 days.

(21) Appl. No.: 16/181,935

(22) Filed: Nov. 6, 2018

(65) Prior Publication Data

US 2020/0007434 A1 Jan. 2, 2020

(30) Foreign Application Priority Data

Jun. 29, 2018 (CN) .......................... 201810699577.4

(51) Int. Cl.
*H04L 12/937* (2013.01)
*H04L 12/705* (2013.01)

(52) U.S. Cl.
CPC ............ *H04L 45/18* (2013.01); *H04L 49/253* (2013.01)

(58) Field of Classification Search
USPC ........................................................ 370/389
See application file for complete search history.

(56) References Cited

U.S. PATENT DOCUMENTS

| | | | | |
|---|---|---|---|---|
| 6,262,977 | B1* | 7/2001 | Seaman | H04L 12/2852 370/254 |
| 6,898,189 | B1* | 5/2005 | Di Benedetto | H04L 41/00 370/217 |
| 8,139,508 | B1* | 3/2012 | Roskind | H04L 12/433 370/255 |
| 10,390,290 | B1* | 8/2019 | Zhang | H04W 76/11 |
| 2013/0084063 | A1* | 4/2013 | Hu | H04L 49/10 398/2 |
| 2014/0341030 | A1* | 11/2014 | Kuo | H04L 47/122 370/235 |
| 2014/0362706 | A1* | 12/2014 | Lee | H04L 47/122 370/238 |
| 2016/0164804 | A1* | 6/2016 | Mekad | H04L 49/101 370/401 |
| 2016/0285750 | A1* | 9/2016 | Saquib | H04L 43/026 |

\* cited by examiner

*Primary Examiner* — Jeffrey M Rutkowski
*Assistant Examiner* — Luna Weissberger
(74) *Attorney, Agent, or Firm* — Birch, Stewart, Kolasch & Birch LLP

(57) ABSTRACT

A network interface card installed in a chassis switch, which includes a switch device and a controller, is provided. The switch device includes a plurality of ports coupled to other network interface cards in the chassis switch, and each of the other network interface cards is a fabric card or a line card. The controller is configured to perform different acts according to the card type of the network interface card, wherein the acts constitute a specific process of path planning which may prevent loops from occurring in the communication paths of control packet delivery between multiple network interface cards in the chassis switch.

6 Claims, 8 Drawing Sheets

NETWORK INTERFACE CARDS, FABRIC CARDS, AND LINE CARDS FOR LOOP AVOIDANCE IN A CHASSIS SWITCH

CROSS REFERENCE TO RELATED APPLICATIONS

This application claims priority of China Patent Application No. 201810699577.4, filed on Jun. 29, 2018, the entirety of which is incorporated by reference herein.

BACKGROUND OF THE APPLICATION

Field of the Application

The application generally relates to path planning of multiple network interface cards, and more particularly, to network interface cards, fabric cards, and line cards for loop avoidance in a chassis switch.

Description of the Related Art

With the rapid development of network communication technologies, demand for greater network bandwidth has been rising, along with fast-changing network requirements. In response, network deployment configurations need to be dynamically and easily adjustable.

Chassis switches are commonly used in network deployments due to the fact that various communication components, such as one or more network interface cards of different types, may be installed therein to satisfy different network requirements. A chassis switch usually includes multiple network interface cards, and thus, management of these cards within a chassis switch is required. It is common for control packets to be used as the means to achieve the management of these cards within a chassis switch.

FIG. 1 is a block diagram illustrating a conventional way of path planning for control packets to be delivered between the network interface cards within a chassis switch. Generally, each network interface card may be a fabric card or a line card. As shown in FIG. 1, each fabric card is communicatively coupled to each line card, so that control packets may be sent therebetween for management purposes. However, loops can be developed in the path for control packet delivery, since each fabric card is communicatively coupled to each line card. Specifically, loops happen when the control packets used for managing these cards are sent in a multicast or broadcast manner, and these loops may lead to a broadcast storm. Unfortunately, a broadcast storm may cause a traffic jam in communications between the network interface cards, and this may overwhelm the network interface cards as they struggle to keep up with processing the flood of control packets. As a result, the performance of the chassis switch will be seriously affected.

When path planning is applied for loop avoidance, the dynamically changing statuses of the network interface cards in the chassis switch (e.g., each card may be dynamically installed, removed, or malfunctioned) may multiply the difficulty of path planning. Conventionally, an additional controller may be employed and dedicated for performing the task of path planning. However, employing an additional controller may significantly increase the hardware cost of a chassis switch, and the performance of the chassis switch may also be affected therefrom.

BRIEF SUMMARY OF THE APPLICATION

In order to solve the aforementioned problem, the present application proposes network interface cards, fabric cards, and line cards for loop avoidance in a chassis switch. In addition, the loop avoidance may adapt to the dynamic status changes of the network interface cards.

In one aspect of the application, a network interface card installed in a chassis switch is provided. The network interface card comprises a switch device and a controller. The switch device comprises a plurality of ports coupled to other network interface cards in the chassis switch, and each of the other network interface cards is a fabric card or a line card. When the network interface card is a fabric card, the controller is configured to perform acts comprising: configuring the ports to be in a forwarding state and sending a first control packet through each of the ports; receiving a plurality of second control packets from a plurality of line cards through the ports in response to the network interface card being a root fabric card; determining one of the line cards to be a designated line card according to a plurality of second identities in the second control packets; and configuring the ports other than the one coupled to the designated line card to be in a listening state in response to the network interface card being a backup fabric card. When the network interface card is a line card, the controller is configured to perform acts comprising: configuring the ports to be in the listening state and receiving the first control packet from each of a plurality of fabric cards through the ports; determining one of the fabric cards to be the root fabric card according to a plurality of first identities in the first control packet; and configuring the ports to be in the forwarding state in response to the network interface card being the designated line card.

In another aspect of the application, a fabric card installed in a chassis switch is provided. The fabric card comprises a switch device and a controller. The switch device comprises a plurality of ports configured to couple to line cards in the chassis switch. The controller is configured to configure the ports to be in a forwarding state and send a first control packet comprising a first identity through each of the ports. In response to receiving a plurality of second control packets from the line cards through the ports during a period of time, The controller is configured to perform acts comprising: determining one of the line cards to be a designated line card according to a plurality of second identities in the second control packets; and sending a third control packet through each of the ports, wherein the third control packet comprises information of the designated line card and the fabric card being a root fabric card.

In yet another aspect of the application, a line card installed in a chassis switch is provided. The line card comprises a switch device and a controller. The switch device comprises a plurality of ports configured to couple to fabric cards in the chassis switch. The controller is configured to configure the ports to be in a listening state and receive a plurality of first control packets from the fabric cards through the ports, determine one of the fabric cards to be a root fabric card according to a plurality of first identities in the first control packets, and configure one of the ports, which is coupled to the root fabric card, to be in a forwarding state for sending a second control packet comprising a second identity.

Other aspects and features of the present application will become apparent to those with ordinarily skill in the art upon review of the following descriptions of specific embodiments of the network interface cards, fabric cards, and line cards for loop avoidance in a chassis switch.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
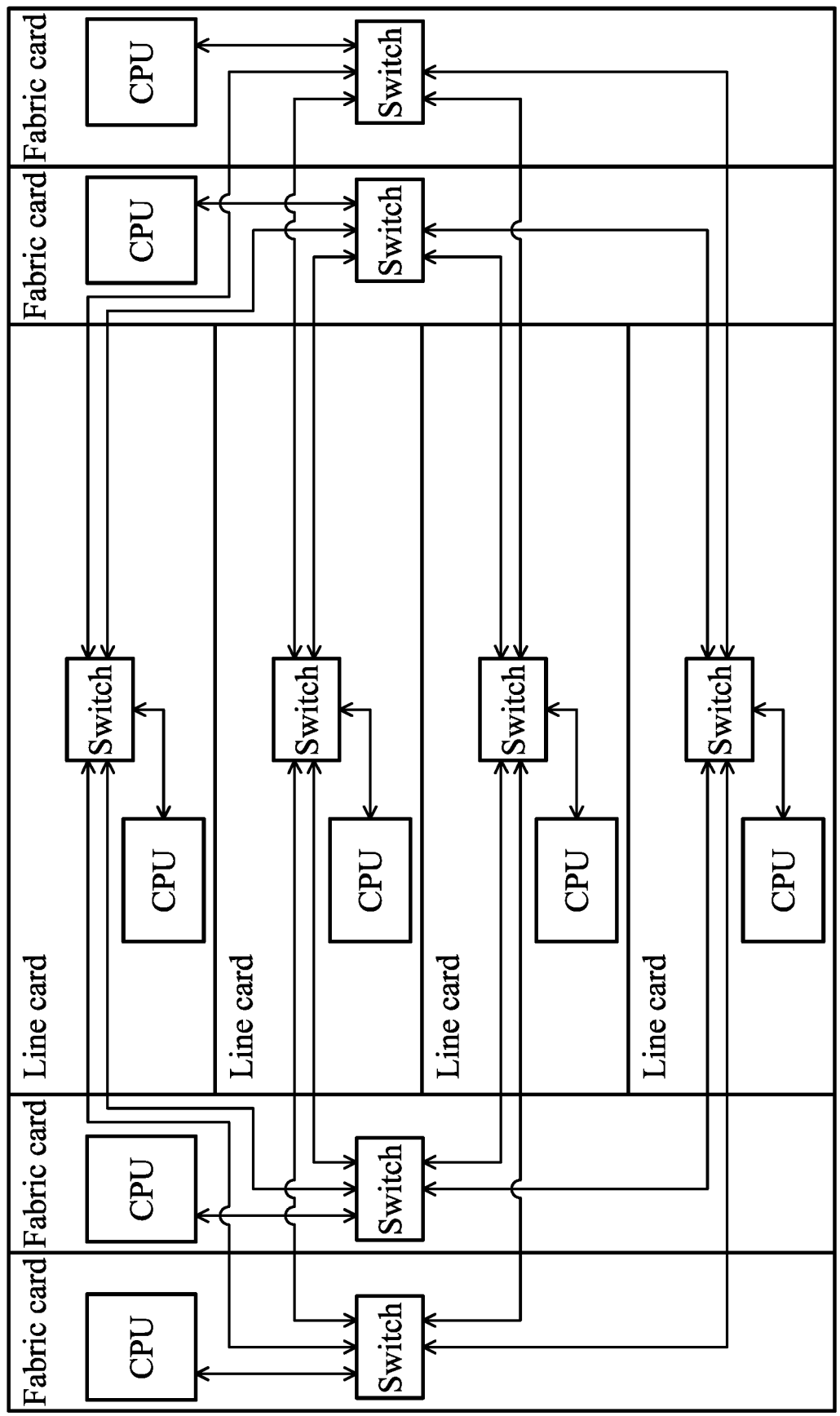
FIG. 1 is a block diagram illustrating a conventional way of path planning for control packets to be delivered between the network interface cards within a chassis switch.
Figure 2:
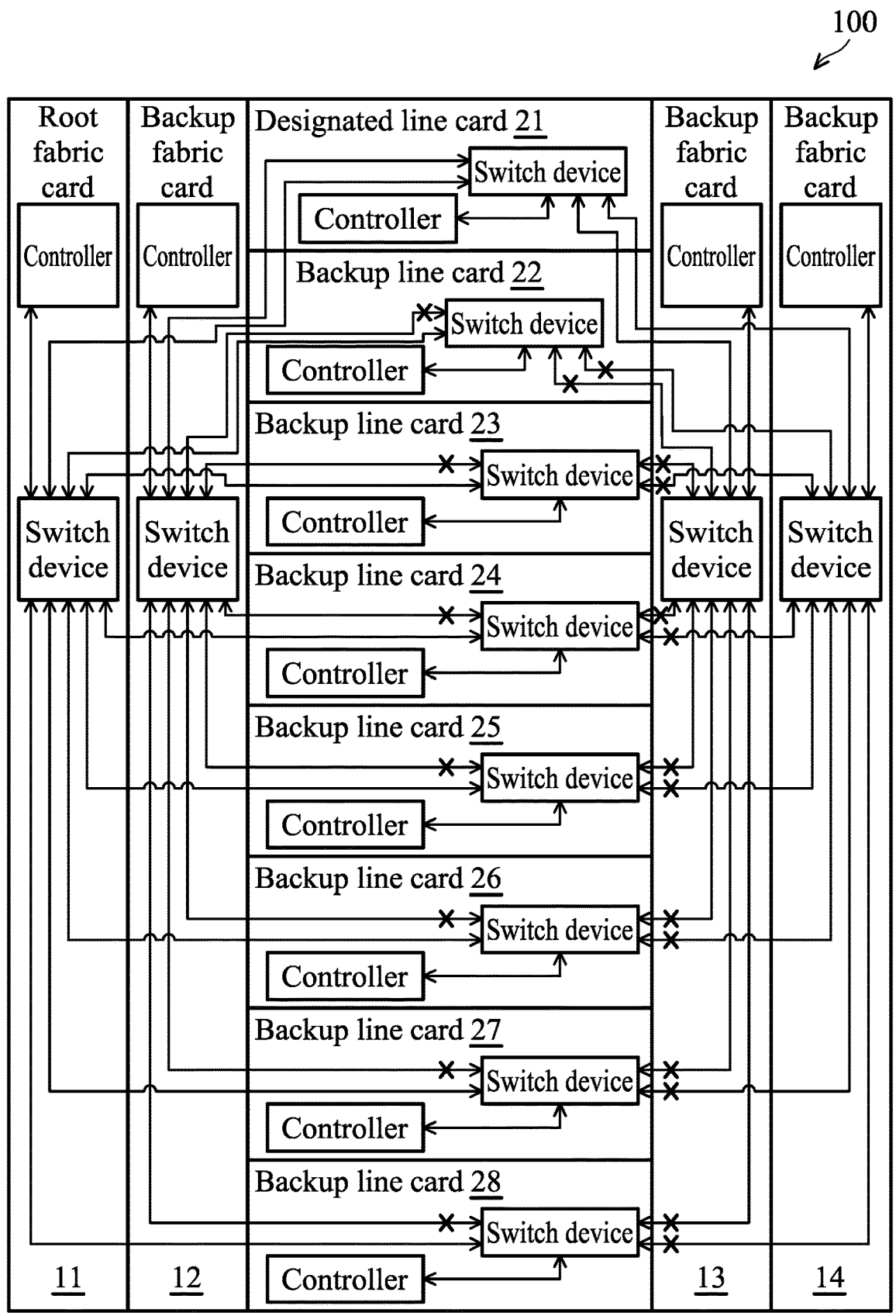
FIG. 2 is a block diagram illustrating path planning for control packets to be delivered between the network interface cards within a chassis switch according to an embodiment of the application.

FIG. 2 is a block diagram illustrating path planning for control packets to be delivered between the network interface cards within a chassis switch according to an embodiment of the application. The chassis switch 100 includes a plurality of network interface cards, each of which may be a fabric card or a line card.

The chassis switch 100 may adapt to various scale of a local area network to allow serving more or fewer network devices in the local area network, by dynamically updating the configurations of the network interface cards installed in the chassis switch 100. For example, the local area network may be an Ethernet, a twisted-pair cable network, or a coaxial cable network. The local area network may also be referred to as an internal network, which generally covers a small area, such as an office or a floor of a building. Each network interface card in the chassis switch 100 may be connected to a respective network device including network terminal device and network intermediary device. For example, the network terminal device may be as a laptop computer, a desktop computer, a smartphone, a tablet Personal Computer (PC), a workstation, or a server, etc. Also, the network intermediary device may be as an Ethernet switch.

In this embodiment, the chassis switch 100 includes 4 fabric cards 11~14 and 8 line cards 21~28, wherein each fabric card is coupled to every line card and not coupled to other fabric cards, while each line card is coupled to every fabric card and not coupled to other line cards.

It should be understood that the number of the network interface cards described in the embodiment of FIG. 2 are for illustrative purposes only and are not intended to limit the scope of the application. For example, the chassis switch 100 may include more or fewer than 4 fabric cards, and/or more or fewer than 8 line cards.

Although not shown, the chassis switch 100 may include multiple slots, in each of which a network interface card may be inserted. Specifically, the slots may be divided into fabric-card slots and line-card slots for installations of fabric cards and line cards, respectively. Particularly, each network interface card may be allocated with a respective identity according to the placement of the slot in which the network interface card is inserted in the chassis switch 100.

Please note that, in the present application, each network interface card performs different acts according to its own card type (e.g., fabric card or line card), to cooperate with other network interface cards for realizing path planning for control packets to be delivered between the network interface cards without causing a broadcast storm. Referring back to FIG. 2, the result of path planning shows that one of the fabric cards 11~14 (e.g., the fabric card 11) is determined as the root fabric card and other fabric cards are determined as the backup fabric cards. In addition, the result of path planning shows that one of the line cards 21~28 (e.g., the line card 21) is determined as the designated line card and other line cards are determined as the backup line cards. Particularly, only the root fabric card (e.g., the fabric card 11) may configure the ports coupled to all line cards to be in the forwarding state, and only the designated line card (e.g., the line card 21) may configure the ports coupled to all fabric cards to be in the forwarding state. Each backup fabric card and each backup line card may configure the ports that coupled to each other to be in the listening state, such that packet forwarding between the backup fabric cards and the backup line cards are disabled (denoted as links with crosses in FIG. 2) to prevent loops that may lead to a broadcast storm.

Figure 3:
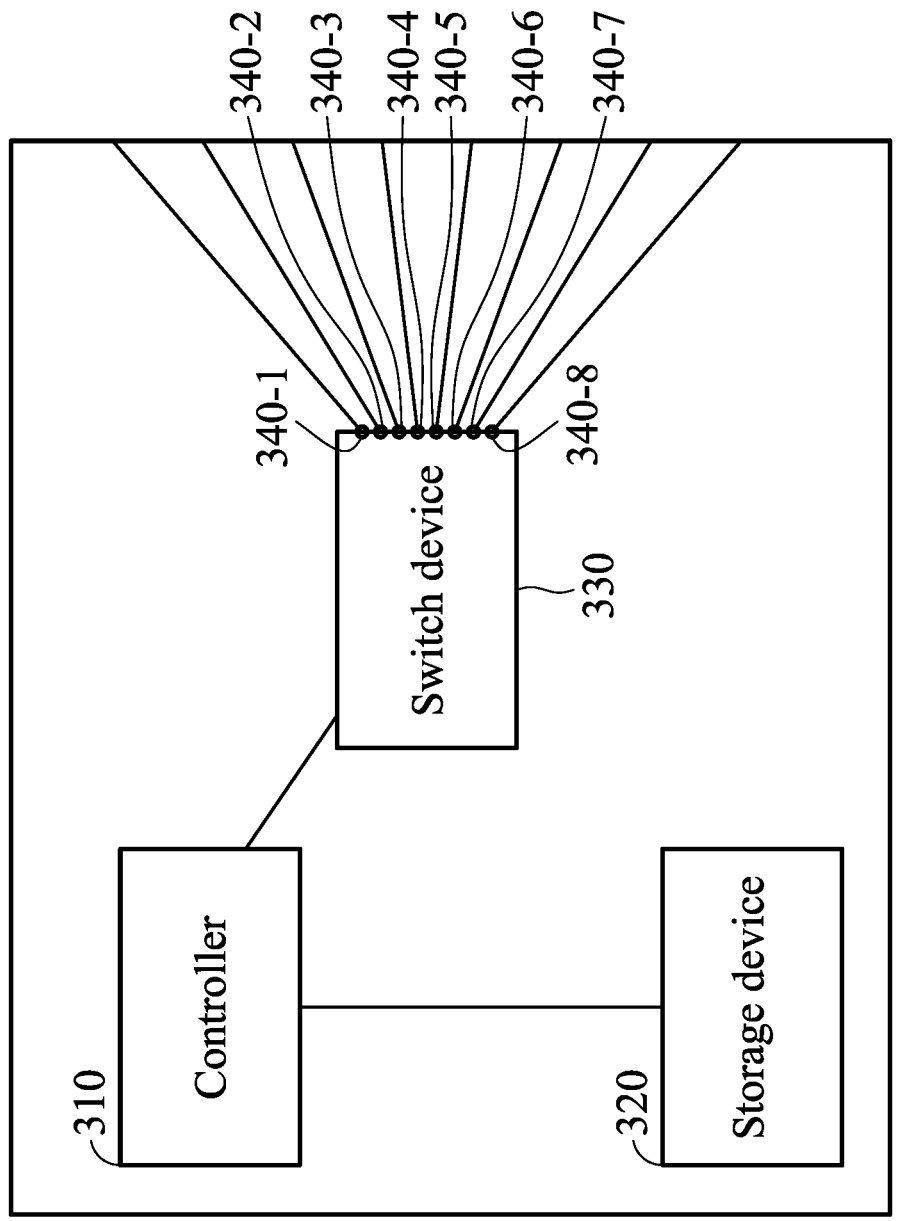
FIG. 3 is a block diagram illustrating a fabric card according to the embodiment of FIG. 2.

FIG. 3 is a block diagram illustrating a fabric card according to the embodiment of FIG. 2. In this embodiment, the chassis switch 100 includes 4 fabric cards and 8 line cards, wherein the block diagram of each fabric card is depicted in FIG. 3. Specifically, a fabric card includes a controller 310, a storage device 320, a switch device 330, and multiple ports 340-1 to 340-8.

The controller 310 may be a general-purpose processor, a Central Processing Unit (CPU), a Micro Control Unit (MCU), an Application Processor (AP), a Digital Signal Processor (DSP), or the like, which includes various circuits for providing the functions of data processing and computing, storing or retrieving data to and from the storage device 320, controlling the operation of the switch device 330 for sending and receiving control packets, and configuring the states of the ports 340-1 to 340-8.

In particular, the controller 310 is responsible for coordinating the operations of the storage device 320, the switch device 330, and the ports 340-1 to 340-8 to perform the method for loop avoidance described in the present application.

As will be appreciated by persons skilled in the art, the circuits in the controller 310 will typically comprise transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 320 may be a Random Access Memory (RAM), a FLASH memory, a cache memory, or any type of memory, or another type of storage medium, for storing machine-readable instructions or program code (e.g., program code of the method for loop avoidance), and data, such as the record kept by each network interface card.

The switch device 330 is configured to configure each of the ports 340-1 to 340-8 to be in the forwarding state or listening state according to the control signals issued by the controller 310, and sending and receiving control packets through the ports 340-1 to 340-8. In other words, the switch device 330 is responsible for delivering control packets which are used for managing the network interface cards. In one embodiment, the switch device 330 may be an (Gigabit) Ethernet switch or Ethernet switch chip in compliance with the Institute of Electrical and Electronics Engineers (IEEE) 802.3, IEEE 802.3u, IEEE 802.3ab, or IEEE 802.3x standard.

Each of the ports 340-1 to 340-8 is coupled to a respective one of the line cards 21-28 in the chassis switch 100, for receiving and sending/forwarding control packets from and to the coupled line card.

It should be understood that the components described in the embodiment of FIG. 3 are for illustrative purposes only and are not intended to limit the scope of the application. For example, a fabric card may include an additional controller which is used for forwarding data packets (i.e., the function of this additional controller is different from the controller 310). Alternatively, the number of ports of a fabric card may be adjusted according to the number of line cards installed in the chassis switch 100.

Figure 4:
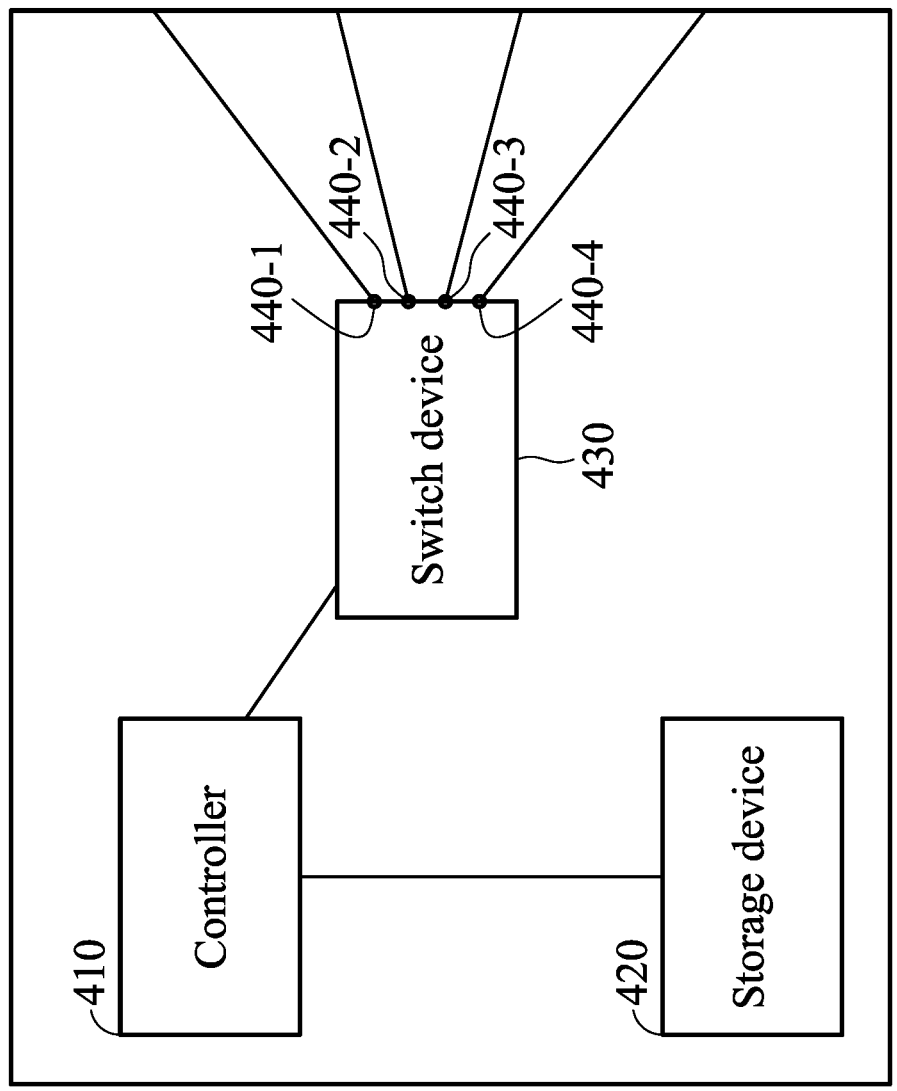
FIG. 4 is a block diagram illustrating a line card according to the embodiment of FIG. 2.
Figure 5A:
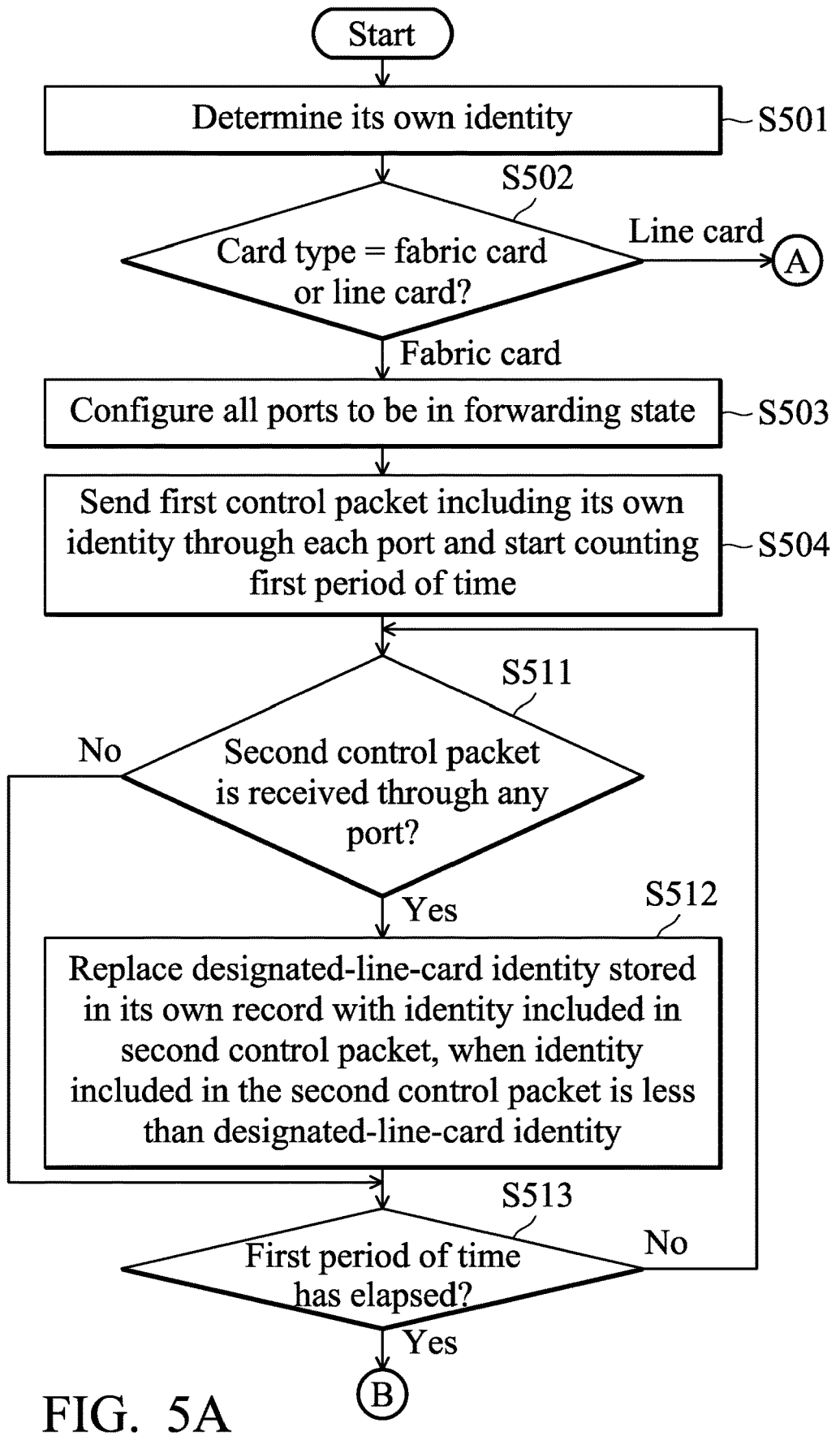
FIGS. 5A to 5D show a flow chart illustrating the method for loop avoidance according to an embodiment of the application.
Figure 5B:
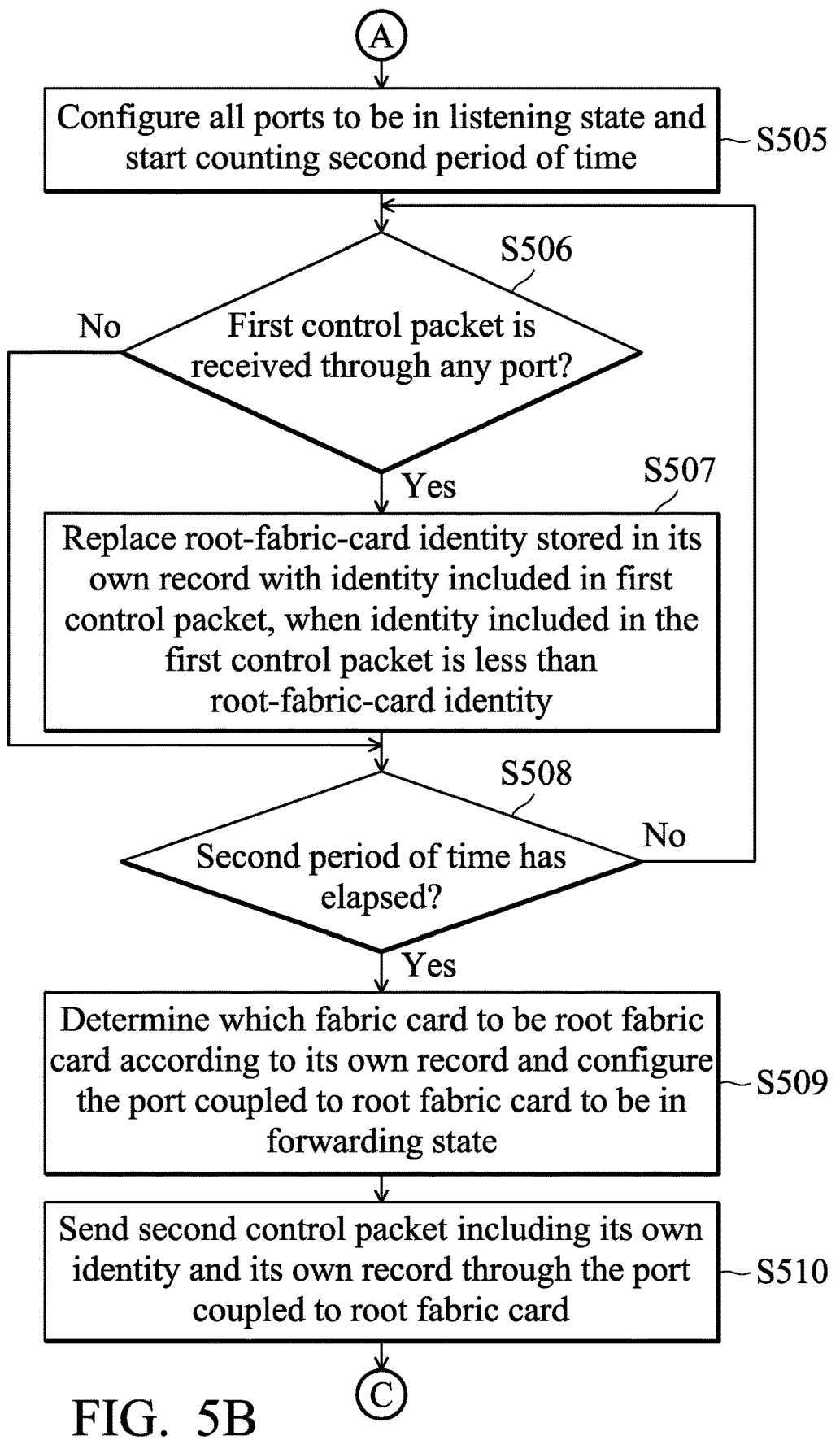
Figure 5C:
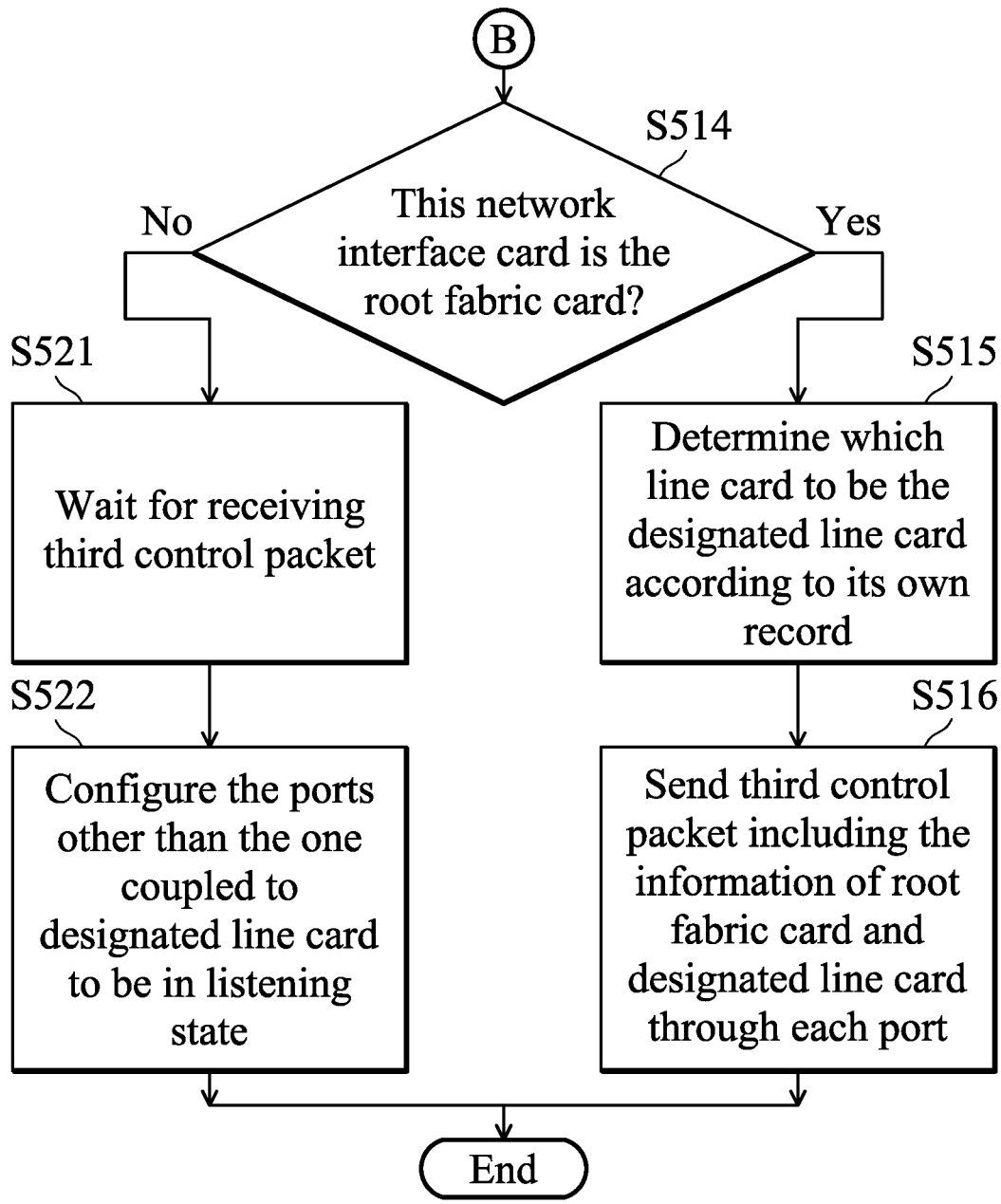
Figure 5D:
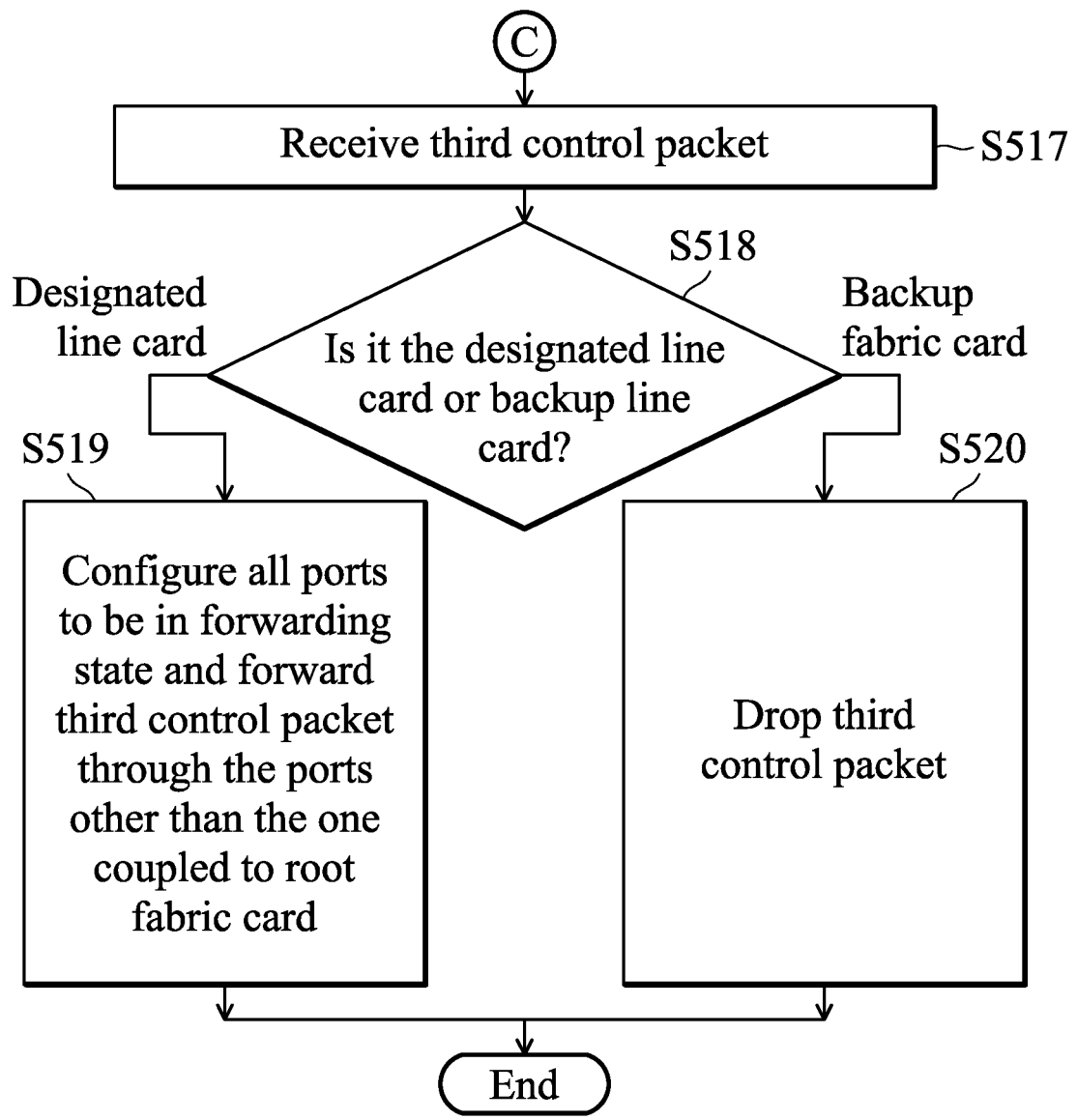

FIG. 4 is a block diagram illustrating a line card according to the embodiment of FIG. 2. In this embodiment, the chassis switch 100 includes 4 fabric cards and 8 line cards, wherein the block diagram of each line card is depicted in FIG. 4. Specifically, a line card includes a controller 410, a storage device 420, a switch device 430, and ports 440-1 to 440-4.

The controller 410 may be a general-purpose processor, a CPU, an MCU, an AP, a DSP, or the like, which includes various circuits for providing the functions of data processing and computing, storing or retrieving data to and from the storage device 420, controlling the operation of the switch device 430 for sending and receiving control packets, and configuring the states of the ports 440-1 to 440-4.

In particular, the controller 410 is responsible for coordinating the operations of the storage device 420, the switch device 430, and the ports 440-1 to 440-4 to perform the method for loop avoidance described in the present application.

As will be appreciated by persons skilled in the art, the circuits in the controller 410 will typically comprise transistors that are configured in such a way as to control the operation of the circuitry in accordance with the functions and operations described herein. As will be further appreciated, the specific structure or interconnections of the transistors will typically be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 420 may be a RAM, a FLASH memory, a cache memory, or any type of memory, or another type of storage medium, for storing machine-readable instructions or program code (e.g., program code of the method for loop avoidance), and data, such as the record kept by each network interface card.

The switch device 430 is configured to configure each of the ports 440-1 to 440-4 to be in the forwarding state or listening state according to the control signals issued by the controller 310, and sending and receiving control packets through the ports 440-1 to 440-4. In other words, the switch device 430 is responsible for delivering control packets which are used for managing the network interface cards. In one embodiment, the switch device 430 may be a (Gigabit) Ethernet switch in compliance with the IEEE 802.3, IEEE 802.3u, IEEE 802.3ab, or IEEE 802.3x standard.

Each of the ports 440-1 to 440-4 is coupled to a respective one of the fabric cards 11-14 in the chassis switch 100, for receiving and sending/forwarding control packets from and to the coupled fabric card.

It should be understood that the components described in the embodiment of FIG. 4 are for illustrative purposes only and are not intended to limit the scope of the application. For example, a line card may include an additional controller which is used for forwarding data packets (i.e., the function of this additional controller is different from the controller 410). Alternatively, the number of ports of a line card may be adjusted according to the number of fabric cards installed in the chassis switch 100.

FIGS. 5A to 5D show a flow chart illustrating the method for loop avoidance according to an embodiment of the application. In this embodiment, the method for loop avoidance may be applied to a network interface card (e.g., a fabric card or a line card) in a chassis switch.

To begin with, the network interface card determines its own identity according to the placement of the slot in which the network interface card is inserted in the chassis switch 100 (step S501), and then determines whether its own card type is a fabric card or line card (step S502).

Subsequent to step S502, when the network interface card is a fabric card, it configures all ports to be in the forwarding state (step S503). Specifically, when a port is configured to be in the forwarding state, the network interface card (e.g., a fabric card or a line card) is able to perform packet sending and receiving (such as sending/forwarding control packets to other network interface cards, and/or receiving control packets from other network interface cards) through the port. Next, the network interface card sends a first control packet including its own identity through each port and starts counting a first period of time (step S504). In one embodiment, the first control packet may be a Bridge Protocol Data Unit (BPDU).

Subsequent to step S502, when the network interface card is a line card, it configures all ports to be in the listening state and starts counting a second period of time (step S505). Specifically, when a port is configured to be in the listening state, the network interface card (e.g., a fabric card or a line card) is able to perform packet receiving, instead of packet sending, through the port. Next, the network interface card determines whether the first control packet is received through any port (step S506), and if so, replaces the root-fabric-card identity stored in its own record with the identity included in the first control packet, when the identity included in the first control packet is less than the root-fabric-card identity (step S507). That is, in this embodiment, the fabric card corresponding to the smallest identity among the identities included in all received first control packets is selected as the root fabric card. Alternatively, in another embodiment, the fabric card corresponding to the largest identity among the identities included in all received first control packets may be selected as the root fabric card.

In one embodiment, each network interface card may keep a respective record for storing the identity of the root fabric card, the identity of the designated line card, and its own identity.

Subsequent to step S507 and the 'NO' branch of step S506, the network interface card determines whether the second period of time has elapsed (step S508), and if not, the method flow returns to step S506. Otherwise, if the second period of time has elapsed, it may be concluded that the network interface card has received the first control packets from all other fabric cards during the second period of time, and then, it determines which one of the fabric cards to be as the root fabric card according to its own record and configures the port coupled to the root fabric card to be in the forwarding state (step S509). Next, the network interface card sends a second control packet including its own identity and its own record through the port coupled to the root fabric card (step S510).

Subsequent to step S504, the network interface card determines whether the second control packet is received through any port (step S511), and if so, it means that the network interface card is the root fabric card, and then, the network interface card replaces the designated-line-card identity stored in its own record with the identity included in the second control packet, when the identity included in the second control packet is less than the designated-line-card identity (step S512). That is, in this embodiment, the line card corresponding to the smallest identity among the identities included in all received second control packets is selected as the designated line card. Alternatively, in another embodiment, the line card corresponding to the largest identity among the identities included in all received second control packets may be selected as the designated line card.

Subsequent to step S512 and the 'NO' branch of step S511, the network interface card determines whether the first period of time has elapsed (step S513), and if not, the method flow returns to step S511. Otherwise, if the first period of time has elapsed, it may be concluded that the network interface card has received the second control packets from all line cards during the first period of time. Next, the network interface card determines whether it is the root fabric card or a backup fabric card according to the determination of whether it has received a second control packet (step S514). If the network interface card is the root fabric card, it determines which one of the line cards to be the designated line card according to its own record (step S515), and then sends a third control packet including the information of the root fabric card and the designated line card through each port (i.e., information indicating which fabric card is the root fabric card and which line card is the designated line card) (step S516).

Subsequent to step S510, the network interface card receives the third control packet after sending the second control packet (step S517), and then determines whether it is the designated line card or a backup line card according to the information included in the third control packet (step S518).

Subsequent to step S518, if the network interface card is the designated line card, it configures all ports to be in the forwarding state and forwards the third control packet through the ports other than the one coupled to the root fabric card (step S519), and the method ends.

Subsequent to step S518, if the network interface card is a backup line card, it drops the third control packet (step S520), and the step of method ends.

Subsequent to step S514, if the network interface card is not the root fabric card, it waits for receiving the third control packet forwarded by the designated line card (step S521). Specifically, when receiving the third control packet forwarded by the designated line card, the network interface card may determine which fabric card is the root fabric card and which line card is the designated line card according to the received third control packet, and it may determine that it is a backup fabric card. After that, the network interface card configures the ports other than the one coupled to the designated line card to be in the listening state (step S522), and the step of method ends.

In view of the forgoing embodiments, it should be appreciated that the present application proposes a specific process of path planning which may prevent loops from occurring in the communication paths of control packet delivery between the network interface cards in a chassis switch, thereby improving the efficiency of resource utilization with respect to the network interface cards and improving the performance of the chassis switch. In addition, the path planning described in the present application may be accomplished while adapting to the dynamic status changes of the network interface cards, without resulting in additional cost for employing an extra controller to perform the task of path planning.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Note that use of ordinal terms such as "first", "second", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. A fabric card, installed in a chassis switch, comprising:
a switch device, comprising a plurality of ports configured to couple to line cards in the chassis switch; and
a controller, configured to configure all the ports to be in a forwarding state where packet forwarding is enabled and send a first control packet comprising a first identity through each of the ports, determine the fabric card to be a root fabric card in response to receiving a plurality of second control packets from the line cards through the ports during a period of time, and determine the fabric card to be a backup fabric card in response to not receiving any of the second control packets from the line cards through the ports during the period of time;
wherein in response to the fabric card being determined to be a root fabric card, the controller is further configured to perform acts comprising:
determining only one of the line cards to be a designated line card and other line cards to be backup line cards according to a plurality of second identities in the second control packets; and
sending a third control packet through each of the ports, wherein the third control packet comprises information of the only one designated line card among the plurality of line cards and the fabric card being a root fabric card among a plurality of fabric cards in the chassis switch;
wherein in response to the fabric card being determined to be a backup fabric card, the controller is further configured to perform acts comprising:

receiving the third control packet forwarded by the designated line card; and based on the third control packet, configuring the ports coupled to the backup line cards to switch from the forwarding state to a listening state where packet forwarding is disabled, while the port coupled to the only one designated line card remaining in the forwarding state.

2. The fabric card of claim 1, wherein the controller is further configured to determine one of the line cards, which corresponds to the smallest or largest of the second identities, to be the designated line card.

3. A line card, installed in a chassis switch, comprising:
a switch device, comprising a plurality of ports configured to couple to fabric cards in the chassis switch; and
a controller, configured to configure all the ports to be in a listening state where packet forwarding is disabled and receive a plurality of first control packets from the fabric cards through the ports, determine only one of the fabric cards to be a root fabric card according to a plurality of first identities in the first control packets, configure one of the ports, which is coupled to the root fabric card, to switch from the listening state to a forwarding state where packet forwarding is enabled to send a second control packet comprising a second identity, while the other ports remaining in the listening state, determine whether the line card is a designated line card or a backup line card according to a third control packet received from the root fabric card after sending the second control packet, and configure all the ports to switch from the listening state to the forwarding state for forwarding the third control packet in response to the line card being an only designated line card among a plurality of line cards in the chassis switch, or keeping all the ports in the listening state in response to the line card not being the only designated line card.

4. The line card of claim 3, wherein the controller is further configured to determine the fabric cards other than the root fabric card to be one or more backup fabric cards according to the first identities.

5. The line card of claim 3, wherein the controller is further configured to drop the third control packet after the line card is determined to be a backup line card according to the third control packet.

6. The line card of claim 3, wherein the controller is further configured to determine one of the fabric cards, which corresponds to the smallest or largest of the first identities, to be the root fabric card.

\* \* \* \* \*